United States Patent
Gottwald

(10) Patent No.: US 8,937,761 B2
(45) Date of Patent: Jan. 20, 2015

(54) METHOD AND ARRANGEMENT FOR THE RAPID ADJUSTMENT OF THE TILT OF OPTICAL WDM SIGNALS

(75) Inventor: Erich Gottwald, Holzkirchen (DE)

(73) Assignee: Xieon Networks S.a.r.l., Luxemburg (LU)

(*) Notice: Subject to any disclaimer, the term of this patent is extended or adjusted under 35 U.S.C. 154(b) by 634 days.

(21) Appl. No.: 13/035,506

(22) Filed: Feb. 25, 2011

(65) Prior Publication Data

US 2011/0141554 A1 Jun. 16, 2011

Related U.S. Application Data

(60) Continuation of application No. 12/556,825, filed on Sep. 10, 2009, now abandoned, which is a division of application No. 11/200,478, filed on Aug. 9, 2005, now Pat. No. 7,619,812.

(30) Foreign Application Priority Data

Aug. 11, 2004 (DE) .......................... 10 2004 039 025

(51) Int. Cl.
*H04B 10/17* (2006.01)
*H01S 3/30* (2006.01)
*H04B 10/294* (2013.01)
*H04B 10/12* (2006.01)

(52) U.S. Cl.
CPC .................................. *H04B 10/2942* (2013.01)
USPC ...................................... 359/334; 359/337.11

(58) Field of Classification Search
USPC ......................... 359/334, 337.1, 337.4, 337.11
See application file for complete search history.

(56) References Cited

U.S. PATENT DOCUMENTS

| | | |
|---|---|---|
| 6,212,001 B1 | 4/2001 | Bode et al. |
| 6,388,801 B1 | 5/2002 | Sugaya et al. |
| 6,433,921 B1 | 8/2002 | Wu et al. |
| 6,574,037 B2 | 6/2003 | Islam et al. |
| 6,587,259 B2 | 7/2003 | Islam et al. |
| 6,639,715 B2 | 10/2003 | Naito et al. |
| 6,697,189 B2 | 2/2004 | Courtois et al. |
| 6,778,321 B1 | 8/2004 | Islam |
| 6,785,042 B1 | 8/2004 | Onaka et al. |
| 6,798,945 B1 | 9/2004 | Pasquale et al. |
| 6,823,107 B2 * | 11/2004 | Muro et al. ..................... 385/27 |
| 7,024,117 B1 | 4/2006 | Gottwald et al. |
| 7,180,654 B2 | 2/2007 | Sugaya et al. |
| 2002/0021487 A1 | 2/2002 | Akasaka et al. |
| 2002/0041429 A1 | 4/2002 | Sugaya et al. |
| 2002/0101652 A1 | 8/2002 | Hayashi et al. |
| 2002/0105715 A1 | 8/2002 | Naitu et al. |
| 2003/0151799 A1 | 8/2003 | Wight et al. |
| 2004/0080812 A1 | 4/2004 | Sugaya et al. |
| 2004/0156095 A1 | 8/2004 | Tsuzaki et al. |
| 2004/0252999 A1 * | 12/2004 | Onaka et al. .................. 398/177 |
| 2005/0237601 A1 | 10/2005 | Nakaji |

FOREIGN PATENT DOCUMENTS

| | | |
|---|---|---|
| EP | 0933894 A1 | 8/1999 |
| EP | 1278315 A1 | 1/2003 |
| WO | 9929057 A1 | 6/1999 |

* cited by examiner

*Primary Examiner* — Eric Bolda
(74) *Attorney, Agent, or Firm* — Nelson Mullins Riley & Scarborough LLP

(57) ABSTRACT

A tilt correction pump laser is injected into an optical fiber in an opposite direction of the transmission direction of a wavelength multiplex signal and an optical isolator or filter is provided to block the tilt correction signal in order to restrict the effective fiber length for the tilt correction pump signal to enable a faster adjustment of the tilt.

12 Claims, 5 Drawing Sheets

METHOD AND ARRANGEMENT FOR THE RAPID ADJUSTMENT OF THE TILT OF OPTICAL WDM SIGNALS

CROSS REFERENCE TO RELATED APPLICATIONS

This application is a continuation application of U.S. patent application Ser. No. 12/556,825, filed on Sep. 10, 2009, which is a divisional of U.S. patent application Ser. No. 11/200,478, filed on Aug. 9, 2005, which Application claimed priority to German Patent Application No. DE 10 2004 039 025.8, filed Aug. 11, 2004, the foregoing applications being incorporated by reference herein in their entireties.

FIELD OF INVENTION

The invention relates to a method and arrangement for the rapid adjustment of the tilt of optical WDM signals.

SUMMARY OF THE INVENTION

Groups of optical signals with different wavelengths, abbreviated to WDM signals, are transmitted via a fiber optical cable, with which fiber amplifiers using specially doped fibers, being frequently used for amplifying such signals, or (additionally, the Raman effect also being used in the transmission fibers.

With a WDM method, a number of data signals (channels) are combined in each instance into a channel group. As a rule, the "channels" of a transmission band are collectively amplified. The Raman effect results in a tilting of the signal during the transmission, i.e., to an attenuation of the level of the signals with a smaller wavelength/higher frequency and an amplification of the signals with a larger wavelength/lower frequency. This unwanted tilting, in most cases termed as tilt, is compensated for by means of non-linear amplifiers or filters for instance.

WO 99/29057 discloses a method for compensating for the tilt, the tilt being advantageously changed preferably by means of two additional pump signals injected into the transmission fiber. Both pump signals change the tilt in the same rotational direction. In addition, an amplification or attenuation can be achieved depending on whether its frequency is greater or lesser than that of the channel group. This principle can be used for tilt control with the failure of the entire channel group and with the absence of individual signals.

If the transmission takes place in the C-band with a typical total power of 100 mW per amplification section and with channel groups with 80 channels, the stimulated Raman scattering SRS causes an attenuation difference of more than 1 dB. In the case of paths with 10 to 20 amplification sections, the level differences without correction measures in an area between 1528 and 1565 nm result in 10 to 20 dB.

In optical networks with optical add/drop multiplexers (OADM) the level of the channels at the fiber end and thus at the input of the recipient or amplifier also changes due to the additional switching or path switching by optical channels resulting from the SRS with the tilt. A path switch from "red" channels or a fiber tear can result in the reception level of the "blue" channel lying outside the input range of the recipient and thus result in increased non-linearities; the additional switching on of red channels impairs the signal-to-noise ratio for "blue" wavelengths. Corresponding additional switching and path switching for blue channels.

Consequentially, a "connected" network requires dynamic tilt compensators. The hitherto mechanically adjustable compensators known for example from the publication are too slow. Nevertheless the compensation method relating to the practical non-inertial Raman effect known from WO 99/29057 is approaching its limits even with the use of a feed-forward control as a result of the transit time of the light in the fiber and the delay of the correction effect linked therewith.

The object of the invention is to specify a method and an arrangement for rapid tilt control. Furthermore an arrangement suited thereto is specified.

The object is achieved by the claims.

Advantageous developments are described in the dependent claims.

The combination of a tilt correction pump signal (or a number of these pump signals) with an anti-pump signal (or several) is advantageous. The shortening of the tilt adjustment time relates to the shortening of the effective section of the fiber optic cable for the correction pump signal adjusting the tilt by means of stimulated Raman scattering (SRS). This shortening is achieved by, in addition to the correction pump signal, injecting an anti-pump signal additionally into the same fiber, which continuously absorbs more energy of the correction pump signal with an increasing distance from the injection location.

The adjustment time is further reduced by the correction pump signal and the anti-pump signal being injected into a dispersion compensation fiber (DCF) instead of into the transmission fiber.

The known principle of a forward (control) or a backward control or a combination thereof can be used to adjust the tilt and the amplitude.

The invention is described in more detail with reference to exemplary embodiments.

DETAILED DESCRIPTION OF THE INVENTION

Figure 1:
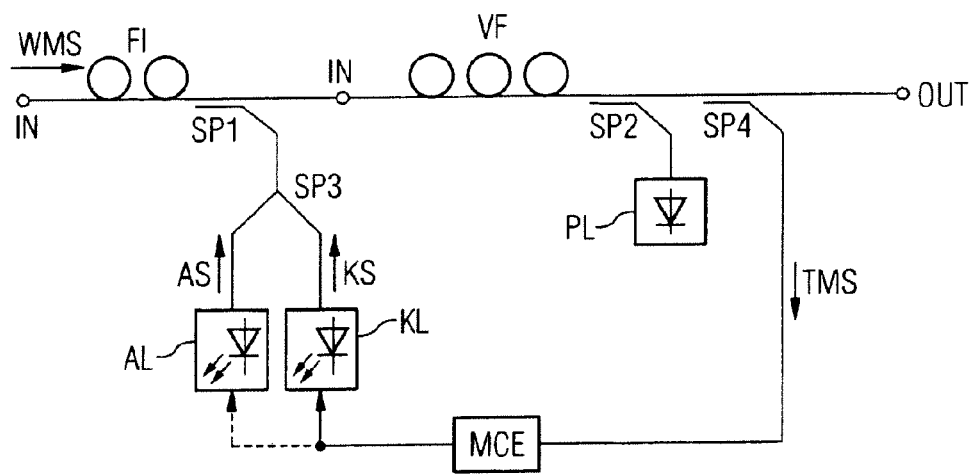
FIG. 1 shows a principle arrangement.

FIG. 1 shows a principle arrangement for tilt correction and/or tilt adjustment. An optical wavelength multiplex signal WMS is fed to the input IN of a fiber amplifier by means of a transmission fiber FI. This is pumped by a pump laser PL via the splitter SP2 against the transmission direction. (At least) one tilt correction pump laser KL is provided for tilt adjustment/compensation, the correction signal KS of which is combined with an anti-pump signal AS of an anti-pump laser AL by a splitter SP2 at first and then injected into the transmission fiber FI. A measurement and control device MCE is provided to measure the tilt, said device diverging and monitoring a tilt measurement signal TMS from the output signal and correspondingly controlling the tilt correction pump laser KL. It can also control the power of the anti-pump laser AL if necessary.

The measurement and control unit MCE controls the correction pump laser in the simplest case, whilst the anti-pump laser AL is constantly active. In the case of a busy system, the amplifier in an active anti-pump laser AL is designed such that the tilt and the level is correctly adjusted at the output OUT. Typically no tilt should be present and the amplitudes of the entire individual signals should correspond to a predetermined value.

Figure 2:
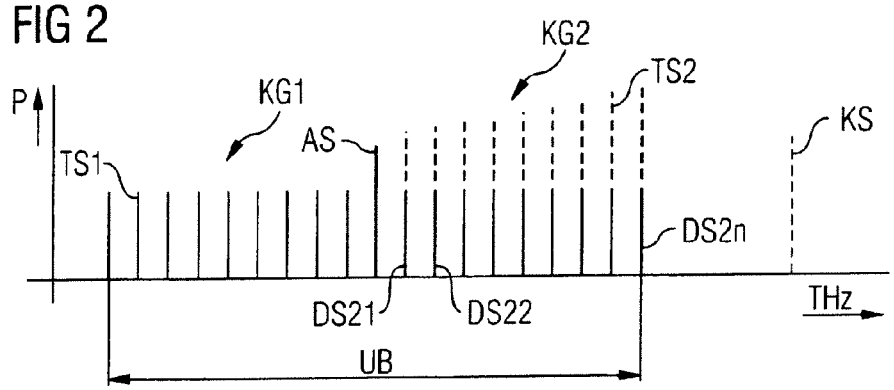
FIG. 2 shows a diagram with two channel groups and the pump signals.

An optical WDM system is considered for example, with which two channel groups KG1 and KG2 are transmitted with 40 channels/data signals DS1, DS2 . . . in the C-band in each instance, as shown in FIG. 2. The frequency of the anti-pump signal AS lies between these transmission bands. This then causes a tilt change around a fixed pivot point. The frequency of the correction laser lies outside the transmission band used.

If the channels now fail or are not busy, as for example all channels of the channel group KG1, then the level P of the data signals DS21, DS22, . . . , DS2n, . . . of the second channel group KG2 tilts anticlockwise (dotted line). By switching on the tilt correction pump laser KL and/or by increasing the power of its pump signal, the tilt is reversed, thereby changing the amplitude of all data signals.

It is advantageous for tilt adjustment that the anti-pump laser AL is permanently active. If the transmission channels are completely occupied, the amplifier is adjusted if necessary by using a tilt filter such that it comprises a level (or desired frequency linear) amplification gradient. With the absence of channels, the level is tilted anticlockwise with a relatively frequent representation of the data signals. To control the tilt, the tilt correction pump laser is switched on and/or its power increased, the correction pump signal KS of which however is more and more absorbed with an increasing distance from the injection location from the anti-pump signal AS, so that the effectiveness of the correction pump signal KS significantly reduces even after running through a short stretch of the transmission fiber FI and the final value is achieved. The power of the anti-pump laser corresponds approximately to that of the tilt correction pump laser, it should lie in a range between 0.5 and twice the power of the tilt correction pump laser.

A number of pump lasers of the same or advantageously selected frequencies can naturally also be used instead of a tilt correction pump laser and/or an anti-pump laser.

The fiber amplifier is generally equipped with an amplification control, so that the output level changes according to the input level, and is thus greater with the use of a 'blue' correction pump laser (with a higher frequency). The amplitudes of the data signals can be retained at the desired value via an additional (correction) pump laser, by means of an amplification change or by means of a frequency-independent, controllable optical attenuator.

The use of a number of pump sources allows the amplification and the tilt to change independently of one another in a known manner. Furthermore, measures for linearization of the amplification curve can naturally be taken in each amplifier.

Figure 3:
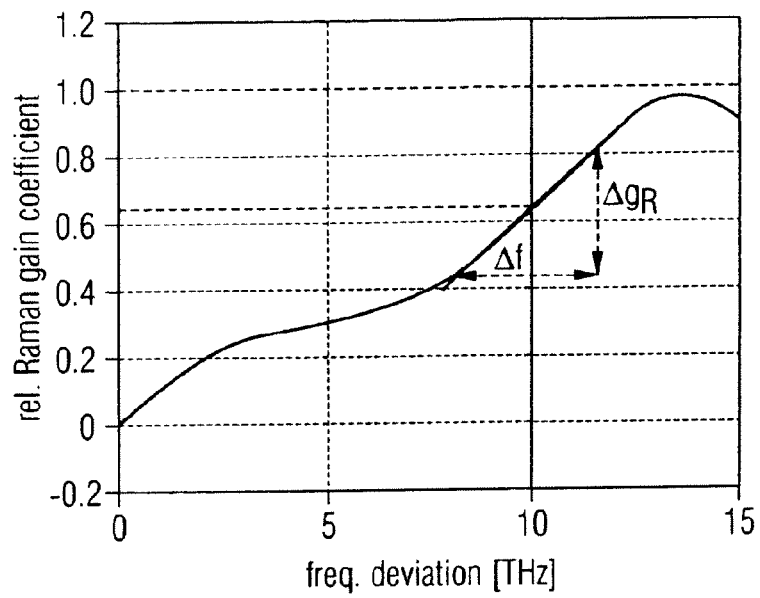
FIG. 3 shows the amplification diagram of a Raman amplifier.

The selection of the frequency of the correction pump signal complies with the Raman amplification diagram and the transmission band and/or channel group used. The diagram of the Raman amplification as a function of the ratio pump laser signal is illustrated in FIG. 3. The frequency deviation of the correction pump signal to the transmission band is selected such that the most linear amplification curve possible (in the logarithmic measure, for example 2B) is given, and this lies at a distance of approximately 10 THz (TeraHertz) from the center of the transmission band used.

The same characteristic curve applies to the attenuation. The frequency of the anti-pump signal AS can be selected such that it lies in the center of the transmission band used between the channel groups KG1 and KG2 and thus has a distance of approximately 10 THz (between 7 Thz and 13 THz) to the correction pump signal. Only one tilt is hereby effected by means of the anti-pump signal. The distance can also be selected such that it lies at approximately 10 THz below the frequency of the transmission band (between 18 THz and 22 THz). In this way the influence is maximally linear with the simultaneous reduction of the amplification. These values apply to conventional fibers and may need to be adapted in the future.

Depending on the control accuracy required, it is sufficient, in the simplest case, to measure the total power of all channels, since the tilt is essentially determined by the total power. The level of external signals of the wavelength multiplex signal WMS can also be measured, or inserted tilt control signals TS1 and TS2 (FIG. 2) which for instance, instead of data signals within the transmission band used, are transmitted at its edges. The tilt control signal also lies outside the transmission band used for the transmission of data signals if this does not result in fault measurements, in particular determined by the transmission characteristics of the amplifier. Similarly, more than two measurement signals can be used for more precise calculation of the tilt and more than one correction pump signal for improved (also no longer linear) correction. The transmission band used can comprise a part of the C-band for the transmission of a channel group for instance.

The adjustment time of the tilt depends on the effective length of the fiber into which the control pump signal is injected. This depends on the performance ratio of the control pump signal and the anti-pump signal and also on the attenuation of the tilt correction pump signal KS in the fiber.

Figure 4:
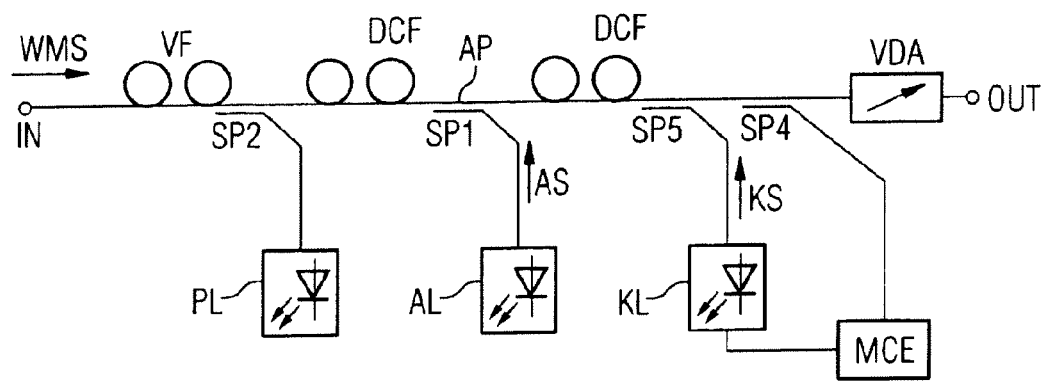
FIG. 4 shows an advantageous variant for the tilt correction.

FIG. 4 shows an improved arrangement for tilt correction. The fiber amplifier contains the series circuit of an amplification fiber VF and a dispersion compensation fiber DCF. The tilt correction pump signal KS is fed to the output of the dispersion compensation fiber via a splitter SP5 and the anti-pump signal AS between two sections of the dispersion compensation fiber via the splitter SP1. In this way, the compensation pump signal KS remains fully active on the output side section of the DCF and is reduced at first during the course of the front section. An even faster reduction of the energy of the correction pump signal KS is reached again by joint injection with the anti-pump signal. The more favorable variant is selected depending on the requirements in terms of adjustment time.

Similarly it is possible to inject the correction pump signal and the anti-pump signal in opposing directions. The compensation pump signal can also be injected on the send side if a corresponding measurement and control device is provided there.

Figure 5:
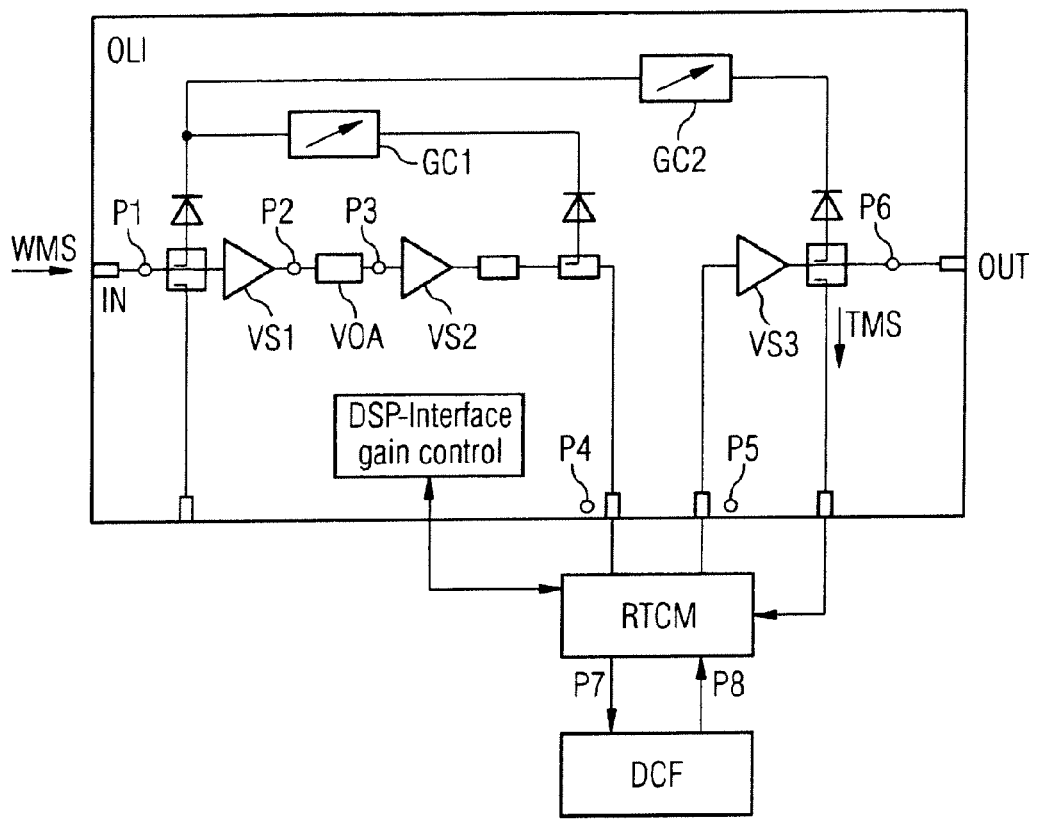
FIG. 5 shows an exemplary embodiment of a fiber amplifier with tilt correction.

FIG. 5 shows a simplified exemplary embodiment of a fiber amplifier OLI with a Raman tilt control module connected thereto. The fiber amplifier OLI is a three-stage (optical line) amplifier with three amplifier stages VS1, VS2 and VS3. The amplification is controlled by means of the amplification control units GC1 and GC2. The amplifier can contain one or a number of gain smoothing filters GFF and optical attenuators VOA. In this case, the Raman tilt control module RTMC is switched on using associated dispersion compensation fibers DCF between the second amplification stage VS2 and the third amplification stage VS3. The wavelength multiplex signal WMS is amplified in the first of two amplification stages VS1, VS2, and is then finally connected through the control module RTCM and finally passed through the dispersion compensation fiber (DCF), the tilt correction pump signal KS and the anti-pump signal AS being injected into the output P8 of said DCF in an opposite direction to the signal direction of the wavelength multiplex signal. The wavelength multiplex signal WMS is injected via the connection points P4, P7, the DCF and the connections P8 and P5 of the control module RTCM, then re-amplified in the third amplification stage VS3 of the control module RTCM and output at the output OUT.

The tilt measurement signal TMS is split off at the output of the third stage VS3, said signal containing either the whole spectrum or already selectively the tilt control signals TS1 and TS3, (FIG. 2). The tilt is determined from the tilt measurement signal TMS and the tilt correction pump signal KS is correspondingly adjusted and/or controlled.

The correction pump signal itself is monitored by means of a split-off measurement signal in a pump signal monitor PM. A smoothing filter GFF balances out non-linearities and a wavelength blocker WB prevents the transmission of pump signals.

Splitters etc have not been shown in the diagram.

The tilt is corrected again by changing the power of the tilt correction pump signal KS. A further necessary correction of the level of the output signal takes by place by intervention in the amplifier control or is carried out by the module internal attenuator VOAC. To elaborate, the tilt of the amplifier is changed by the change of the attenuator, thereby increasing the control area.

Figure 6:
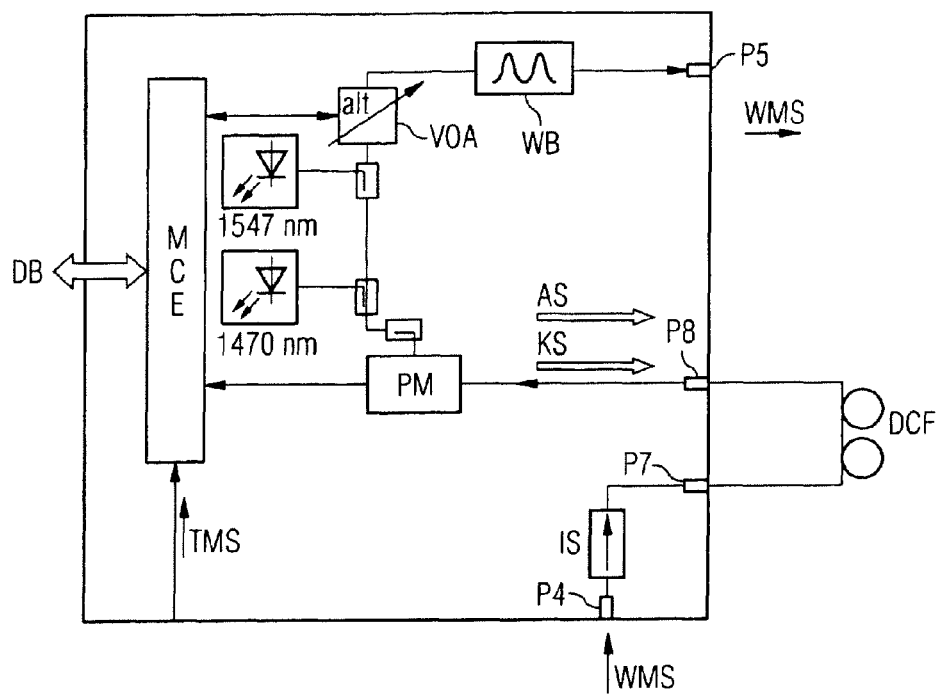
FIG. 6 shows an exemplary embodiment of a tilt control module.

The Raman tilt module RTCM is shown in FIG. 6, in which the description of the connection points is in line with FIG. 5. As already described, the wavelength multiplex signal WMS is connected through between the connection points P4 and P7, in which the pump signals are blocked by means of an optical isolator IS. The dispersion compensation fiber DCF is shown again for clarification purposes. The tilt control pump signal KS and the anti-pump signal AS is injected into the output at the connection point P8. The routing of the control signal and the anti-pump signal in the signal direction are prevented by a wavelength blocker WB. The measurement and control unit MCE is connected to the system via a databus DB.

Figure 7:
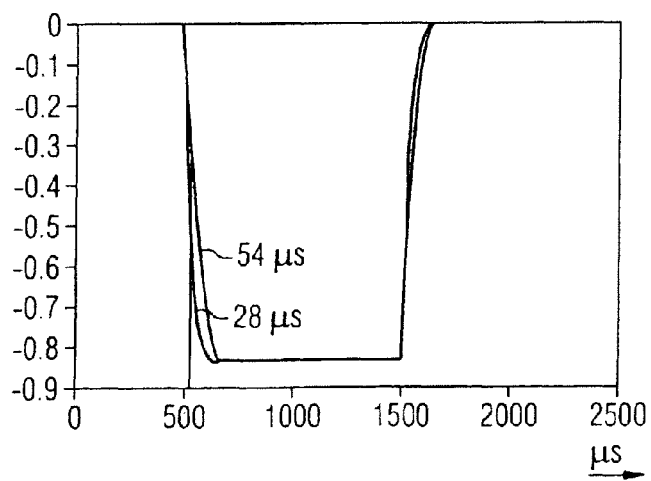
FIG. 7 shows a diagram of the adjustment time.

FIG. 7 shows the shortening of the adjustment time achieved by the invention. In this exemplary embodiment described, the adjustment time is reduced from 54 μs to 28 μs.

Figure 8:
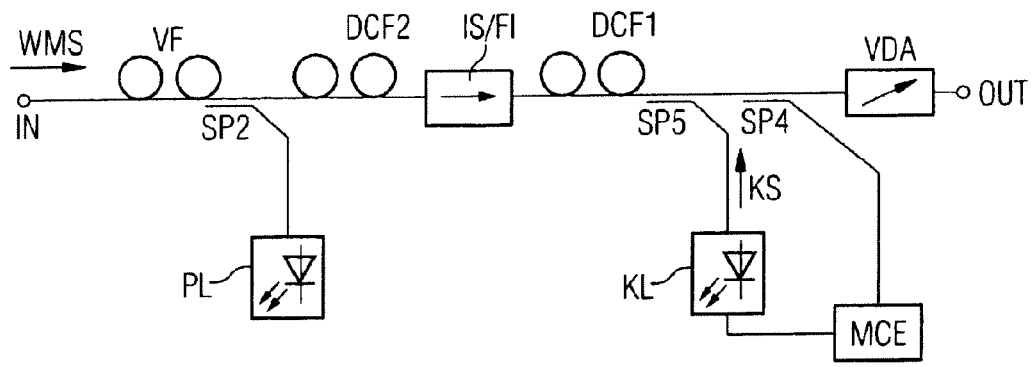
FIG. 8 shows a variant for rapid tilt correction.

FIG. 8 shows a simplified embodiment with an optical isolator IS or filter F1, which is inserted between two winding sections of the dispersion-compensating fiber DCF1 and DCF2, in order to restrict their effective length for the tilt correction pump signal KS. This also includes the limiting case, in which the optical isolator IS or the filter FI of the whole DCF is arranged downstream in relation to the tilt control pump signal KS. The same effect is achieved with the transmission fiber. Although this variant does not have the adaptability of an adjustable anti-pump laser AL, it is nevertheless particularly easy to implement.

The invention claimed is:

1. A method for rapid tilt adjustment of a wavelength multiplex signal transmitted over a waveguide optical fiber, the method comprising:
   determining the tilt and/or level of the wavelength multiplex signal in an amplifier arrangement with the waveguide optical fiber;
   controlling the power of a tilt correction pump laser generating a tilt correction pump signal, which has a frequency outside a transmission band used and a deviation from a transmission band such that an inclined amplification spectrum is given;
   injecting said tilt correction pump signal into the waveguide optical fiber contrary to the transmission direction of said wavelength multiplex signal, and
   blocking the tilt correction signal by an optical isolator or filter inserted in the waveguide optical fiber downstream in relation to the injected tilt correction pump signal and therefore restricting the effective fiber length for the tilt correction pump signal, whereby tilt adjustment time is reduced by at least one quarter.

2. The method according to claim 1, wherein the waveguide optical fiber contains a transmission fiber or an amplifying fiber and a dispersion compensating fiber connected in series.

3. The method according to claim 2, wherein the tilt correction pump signal is injected into the dispersion compensation fiber.

4. The amplifier arrangement according to claim 2, wherein the tilt correction pump signal is blocked by said optical isolator or filter, which is inserted between sections of the dispersion compensation fiber.

5. The method according to claim 1, wherein the tilt and/or level of the wavelength multiplex signal is determined at an output of the amplifier arrangement.

6. The method according to claim 2, wherein a pump signal is injected into the transmission fiber or the amplification fiber.

7. An arrangement for rapid tilt adjustment of a wavelength multiplex signal transmitted over a waveguide optical fiber, the arrangement comprising:
   an optical amplifier containing the waveguide optical fiber;
   at least one controlled tilt correction pump laser for generating a tilt correction pump signal, which has a frequency outside a transmission band used and a frequency deviation to the transmission band such that an inclined amplification spectrum is given;
   a device for injecting the tilt correction pump signal into the waveguide optical fiber contrary to the transmission direction of the wavelength multiplex signal;
   an optical isolator or filter, which is inserted in the waveguide optical fiber downstream in relation to the injected tilt correction pump signal, blocking the tilt correction pump signal and restricting the effective fiber length for the tilt correction pump signal and therefore reducing tilt adjustment time by at least one quarter; and
   a measurement and control device for determining the tilt and/or level of the wavelength multiplex signal and controlling the power of the tilt correction pump laser.

8. The amplifier arrangement according to claim 7, wherein the waveguide optical fiber contains a transmission fiber or an amplifying fiber and a dispersion compensating fiber connected in series.

9. The amplifier arrangement according to claim 8, wherein the tilt correction pump signal is injected into the dispersion compensation fiber.

10. The amplifier arrangement according to claim 8, wherein the waveguide optical fiber contains sections of the dispersion compensating fiber and the optical isolator or filter is inserted between the sections of the dispersion compensation fiber.

11. The amplifier arrangement according to claim 8, the measurement and control device is arranged at an output of the arrangement.

12. The amplifier arrangement according to claim 7, comprising a pump laser for injecting a pump signal into the transmission fiber or amplifying fiber.

* * * * *